(12) United States Patent
Wolfschaffner

(10) Patent No.: US 8,221,035 B2
(45) Date of Patent: Jul. 17, 2012

(54) DOSING DEVICE

(75) Inventor: Hubert Wolfschaffner, Dasing (DE)

(73) Assignee: Pfister GmbH, Augsburg (DE)

( * ) Notice: Subject to any disclaimer, the term of this patent is extended or adjusted under 35 U.S.C. 154(b) by 522 days.

(21) Appl. No.: 12/090,639

(22) PCT Filed: Oct. 18, 2006

(86) PCT No.: PCT/EP2006/010037
§ 371 (c)(1),
(2), (4) Date: Aug. 21, 2008

(87) PCT Pub. No.: WO2007/045449
PCT Pub. Date: Apr. 26, 2007

(65) Prior Publication Data
US 2008/0310936 A1   Dec. 18, 2008

(30) Foreign Application Priority Data
Oct. 18, 2005   (DE) .......................... 10 2005 050 090

(51) Int. Cl.
*B65G 51/36* (2006.01)
(52) U.S. Cl. ............................... 406/31; 406/66; 406/67
(58) Field of Classification Search ............. 406/63–67, 406/32, 33; 222/636
See application file for complete search history.

(56) References Cited

U.S. PATENT DOCUMENTS

| | | | |
|---|---|---|---|
| 2,857,151 A * | 10/1958 | Brabender et al. | 177/16 |
| 3,501,062 A * | 3/1970 | Catalano et al. | 406/134 |
| 3,786,961 A * | 1/1974 | Wahl et al. | 222/55 |
| 4,682,915 A | 7/1987 | Hafner | |
| 5,184,892 A * | 2/1993 | Hafner | 366/10 |
| 5,255,830 A * | 10/1993 | Hafner | 222/370 |
| 5,327,947 A * | 7/1994 | McGregor | 141/71 |
| 5,353,960 A * | 10/1994 | Hafner | 222/77 |
| 5,394,747 A * | 3/1995 | Hafner | 73/218 |
| 5,670,751 A * | 9/1997 | Hafner | 177/1 |
| 6,435,039 B1 * | 8/2002 | Hubert et al. | 73/861.351 |
| 7,226,248 B2 * | 6/2007 | Hafner et al. | 406/146 |
| 7,581,659 B2 * | 9/2009 | Hafner | 222/55 |
| 2004/0232163 A1 | 11/2004 | Reinsch | |

FOREIGN PATENT DOCUMENTS

DE   196 39 740 C1   12/1997
WO   WO 98/50764 A   11/1998

* cited by examiner

*Primary Examiner* — Gene Crawford
*Assistant Examiner* — William R Harp
(74) *Attorney, Agent, or Firm* — Knobbe Martens Olson & Bear LLP

(57) ABSTRACT

In order to increase the fitness for use of a closing device (1) for continuously and gravimetrically dosing pourable material, particularly rough fuels, a flow of material is conveyed from a charging opening (5) to an emptying opening (7) in a housing (4) with a rotor (3), which is driven about a vertical rotation axis, while determining the instantaneous load over a measuring section, and with a force measuring device (10), which detects the instantaneous load of the flow of material guided via the rotor (3) and which is connected to the housing (4) mounted on a pivot axis (8). According to the invention, a vibrating funnel (50) with a vibration generator (52) is provided above the charging opening (5) of the rotor (3).

11 Claims, 2 Drawing Sheets

DOSING DEVICE

BACKGROUND OF THE INVENTION

1. Field of the Invention

The invention relates to a dosing device for the continuous gravimetric dosing of pourable material.

2. Description of the Related Art

Such dosing device is known from WO 98/50764 of the applicant. Therein, a dosing rotor is provided, specifically for heating a cylindrical rotary kiln in a cement calcining process, which is subdivided by essentially radial-extending entrainment ribs. For ensuring the discharge at the emptying opening, the latter is provided with a compressed air nozzle. At the charging end, there may be provided a circulating agitator in order to homogenize the supplied fuels.

Whilst this device is most suitable for dosing bulk material, some problems may arise with respect to coarse fuels like broken pit coal or lignite being fed, but also discharged and charged to subsequent conveyers, since the bulk material may get stuck and form bridges and lumps. The agitators used so far can hardly handle these disturbances in the supply of material and moreover, exhibit a high wear with coarse materials having sharp edges. These conveying disturbances can also cause significant inaccuracies in the result of measurement and thus the metering.

BRIEF SUMMARY OF THE INVENTION

Thus, it is an object of the invention to improve a dosing device of this kind with respect to its wear as well as to enable it to be utilized with coarse bulk material.

The object is achieved by a dosing device for the continuous, gravimetric dosing of pourable material, particularly rough fuels, wherein a flow of material is conveyed from a charging opening to an emptying opening in a housing with a rotor which is driven about a vertical rotation axis, while determining the instantaneous load over a measuring section, and with a force measuring device which detects the instantaneous load of the flow of material guided via the rotor and which is connected to the housing mounted on a pivot axis, wherein a vibrating funnel with a vibration generator is provided above the charging opening of the rotor.

A safe, wear resistant feeding is achieved by arranging a vibrating funnel having a vibration generator above the charging opening. Besides, the vibration generator can be arranged such that the latter predominantly swings in a horizontal direction, so that the result of measurement of the load cell measuring in a vertical direction does not become affected. Thus, the vibrations can also be introduced into the housing and the dosing rotor rotating therein via a correspondingly designed compensator, whereby the emptying is promoted by high-frequency vibrations by avoiding cakings.

Besides, the emptying of the flow of material can substantially be facilitated by a blast nozzle blowing out hot-air or inert gas directly over the conveyed material flow of the bulk material. The blow-out jet from one or more nozzles which are preferentially formed as flat nozzles, breaks up the flow of material passing through the dosing device at its discharge station, thereby achieving a loosening of the bulk material maybe sticking together. Thus, there is achieved a reliable supply and further a complete discharge of the conveyed flow of material from the dosing device and by said loosening, the material flow is prepared for further conveyance.

In an advantageous embodiment, the radial outer ends of the entrainment ribs are connected with a peripheral ring which may be higher than the entrainment ribs to thus provide an outside boundary against any leakage of the bulk material to the outside and a spatial limitation of the air flow of the blast nozzle. In this construction, the central rotor hub is also formed higher to localize the vorticity zone between the peripheral ring and the rotor hub, such that the bulk material skein limited toward the outside and toward the inside will exactly be carried away with the rotary flow.

BRIEF DESCRIPTION OF THE DRAWINGS

Further advantageous developments are the subject-matter of the subclaims. Below, an exemplified embodiment will be explained in more detail and described on the basis of the drawing, wherein:

DETAILED DESCRIPTION OF THE INVENTION

Figure 2:
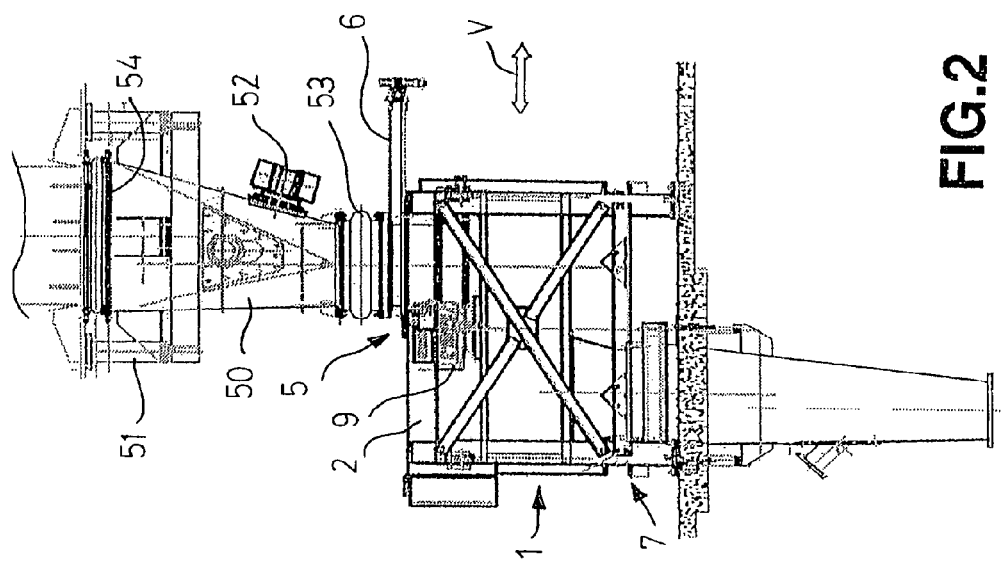
FIG. 2 is a side view rotated 90° of the dosing device.
Figure 1:
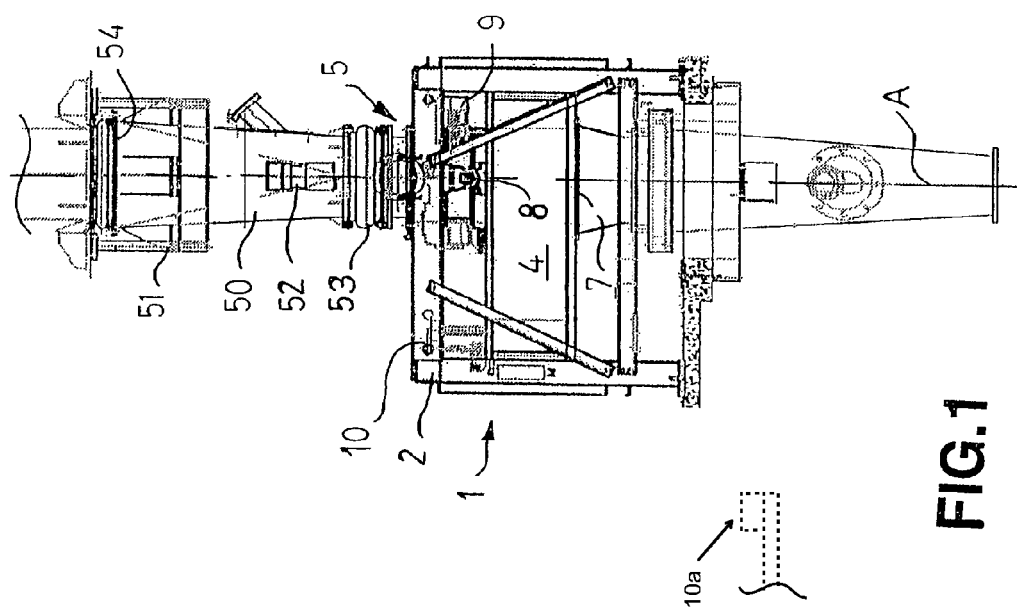
FIG. 1 is a lateral front view of a dosing device.

FIGS. 1 and 2 show a dosing device 1 essentially comprising a dosing rotor 3 (cf. FIG. 4) rotating in a housing 4 which is totally closed except of a charging opening 5 and an emptying opening 7. In this case, the charging opening 5 and the emptying opening 7 are arranged to each other so as to form the longest possible measuring section. The housing 4 is swivel-mounted in a framework 2, as specified below.

The charging opening 5 is provided with a shutter 6 which is supplied with bulk material from a bin or supply bin via a vibrating funnel 50. For loosening, the vibrating funnel 50 has arranged thereto a vibration generator 52 (also to be referred to as a so-called compactor) which predominantly swings in the horizontal direction. The vibration generator 52 can be continuously operated or also be hooked on with particularly difficult kinds of bulk material and with too small instantaneous loads at the dosing rotor 3 respectively, or also with highly varying instantaneous loads, as may be defined and detected by determining thresholds.

Thereby, a reliable supply of the bulk material to the dosing device 1 is guaranteed. Here, the vibrating funnel 50 is elastically suspended in a frame 51, in particular via a compensator 54. Besides, the vibrating funnel 50 is connected with the housing 4 by a compensator 53, which decouples the vibration generator 52 to a large extent in order not to affect the result of measurement, however, still lots pass a certain oscillation portion, in particular in the horizontal direction (cf. arrow V in FIG. 2) in order to thus produce vibrations also in housing 4 and the dosing rotor 3 rotating therein. Thereby, cakings can be avoided as well as the emptying be improved.

Figure 3:
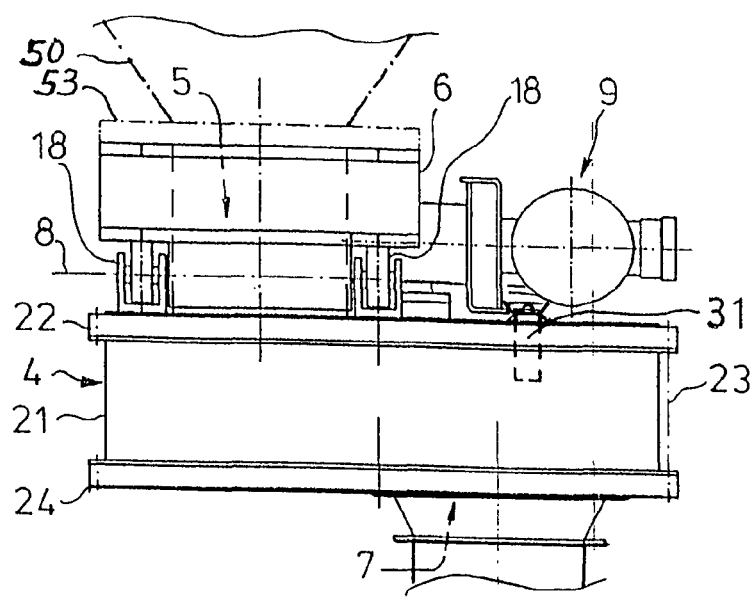
FIG. 3 is an enlarged side view onto the housing.

As shown in FIG. 3 in an enlarged view, two pivot bearings 18 are provided below the slide 6 to form a pivot axis 8, about which the housing 4 may pivot when loaded with material. Seen from above, this pivot axis 8 extends through the center of the top charging opening 5 and the bottom emptying opening 7 to eliminate effects of errors caused by goods supply and exhaustion, respectively. Likewise, the vibration generator is preferentially arranged on this vertical axis A, as is shown in FIG. 1.

A driving means 9 is provided to drive the rotor 3 of the dosing device 1, said driving means 9 here, for example, being constituted by an electric motor not referred to in more detail, and a bevel gear, the exit of which opens to a vertical shaft 25 (cf. FIG. 4) driving the rotor 3. In this case, the driving means 9 is directly mounted to the housing 4, such that it is adapted to follow any rotating motions about the aforesaid pivot axis 8. During the rotating motion about the pivot axis 8, such as caused by the material supply and feeding along the measuring section 2, the housing 4 supports on a force measuring device 10 stationary-arranged in the framework 2 and connected, for example, to the housing 4 via a tie rod.

Different kinds of load cells may be used to represent the force measuring device 10, however, direct-operating sensors are used, such as strain gauges, shearing force sensors, or the like. In doing so, the respective mass of the material flow being conveyed along the measuring section is detected, and the product of instantaneous load by conveying speed is detected to determine the flow rate. The rotational speed of the driving means 9 and thus of the rotor 3 is readjusted by means of a control device known per se and not shown in more detail, to modify the flow rate or to set a specified quantity.

Figure 4:
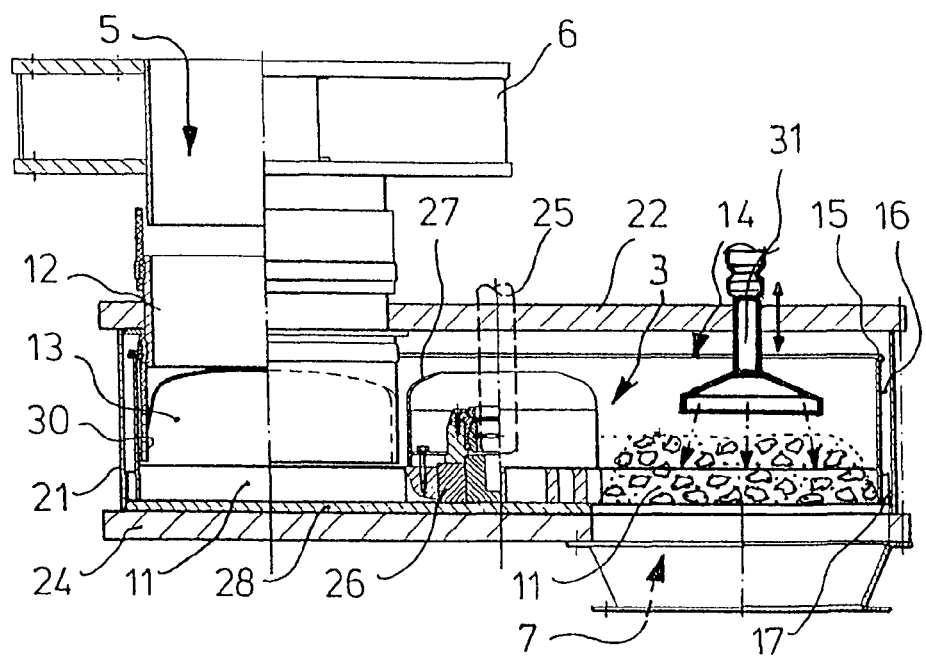
FIG. 4 is a sectional view corresponding to FIG. 3.

As is apparent from FIG. 4, radially extending entrainment ribs 11 of the rotor 3 merely take a partial height of the inner height of the housing 4. For feeding, a hopper 12 is passed through the upper housing wall 22 of the housing 4, said hopper 12 comprising a lower discharge opening 13 which is preferably formed by beveling hopper 12. In this case, the radially arranged entrainment ribs 11 of the rotor 3 are connected to each other by a peripheral ring 14, which results in a high stability of the rotor 3. Furthermore, it is an effect of the peripheral ring 14 extended almost Lip to the upper housing wall 22 to prevent the bulk material fed through the charging opening 5 in the hopper 12 from drifting outwardly. The same is true for the blow-out jet for loosening the bulk material, described below.

In a preferred development, the upper rim 15 of the peripheral ring 14 is flanged to the outside, such that the latter rotates with little play with respect to the housing casing 21. Here, a circumferential gap 16 is formed between the peripheral ring 14 and the housing casing 21 to allow finer particles of the bulk material to accumulate therein, if necessary, to be also conveyed to the emptying opening 7 by means of assistant cams 17. Preferably, the assistant cams 17 are formed by the outer ends of the entrainment ribs 11, for example by just putting the peripheral ring 14 onto the entrainment ribs 11. It should be noted that the emptying opening 7 slightly projects beyond the outer border 14 in a radial direction, thus being in communication with the circumferential gap 16, such that material present in the circumferential gap 16 also drops out downward at the emptying opening 7 and thus is also detected at the measuring section with regard to the instantaneous load. Moreover, in the circumferential gap 16 there is a positive pressure like in the discharge zone, such that throughput is facilitated and particles are prevented from caking, respectively.

As previously mentioned, FIG. 2 shows a side elevation of the dosing device 1, wherein in particular the path of the pivot axis 8 formed by the pivot bearings 18 may be seen. Additionally, the structure of the housing 4 is illustrated, having a housing casing 21, an upper housing wall 22, and a lower housing wall 24 connected to the upper housing wall 22, e.g. by means of screw connections 23. In addition thereto, the vibrating funnel 50 with the lower compensator 53 is indicated in dash-and-dot lines above the charging opening 5. The force measuring device 10 shown in FIG. 1 is arranged at the circumference of the housing 4 to achieve the largest possible effective lever length, however, it may also be mounted still further from or closer toward the pivot axis 8.

Further to the already described components of the dosing device 1, FIG. 4 illustrates the driving shaft 25 plotted in dotted lines from the transverse section, extending from the bevel gear of the driving means 9 and communicating with a rotor hub 26 having radially arranged thereto the entrainment ribs 11. A rotor hub cover 27 is located above the rotor hub 26 and is of a height similar to that of the peripheral ring 14, thus substantially fitting the hopper 12 between the peripheral ring 14 and the rotor hub cover 27 as well as defining the discharge zone. The entrainment ribs 11 rotate on a wearing plate 28 supported on the lower housing wall 24.

In a preferred embodiment, the bottom end portion 30 of the hopper 12 protruding into the housing 4 extends down to the orbital planes of the entrainment ribs 11 with its half facing the feed direction, whilst its half facing the feed direction is provided with a beveled discharge opening 13. By this, a skein-like material flow is formed above the entrainment ribs 11 during the rotary movement of the dosing device 1 and is guided to the emptying opening 7. The hopper 12 is mounted in the upper housing wall 22 and is in communication with the connecting piece of the slide 6 and vibrating funnel 50, respectively, by means of a flexible connecting piece, for example a rubber band. Preferably, the end portion 30 is formed as a flexible end portion as well, such that this end portion 30 of the hopper 12 is designed to be flexible with respect to larger lumps of the coarse fuel.

Herein, the essential part is to position a blast nozzle 31 directly above the flow of material at the emptying opening 7. Thereby, hot-air or inert gas is supplied under pressure, whereby the flow of material is blown out downward. In doing so, on the one hand, the flow of material is broken up and thoroughly intermixed. In contrast to the compressed air known so far, hot-air is better in peeling off cakings and in addition, the inside of the housing 4 is cleaned. At the same time, a gas barrier is achieved against downstream units, e.g. a pneumatic feed line to a cylindrical rotary kiln for cement production, not shown, or a mill working under positive pressure.

Apart from the exact radial alignment drawn herein, it should be noted that the entrainment ribs 11 of the rotor 3 may also be realized in a slightly curved or (in feed direction) arched shape. In order to perform check measurements, the dosing device 1 with its framework 2 can still additionally be supported on load cells 10a as well, which are provided in the floor area of the framework 2. In this case, these check load cells are in communication with the above-mentioned control/regulating device, such that a continuous supply from the supply bin(s) can take place depending on the reference input (fuel consumption).

The invention claimed is:

1. A dosing device for the continuous, gravimetric dosing of pourable material, particularly rough fuels, the dosing device comprising:
   a housing having a charging opening, an emptying opening, and a measuring section, the housing being pivotable about a pivot axis, the charging opening and the emptying opening being spaced apart along the pivot axis;
   a rotor disposed within the housing, the rotor being driven about a vertical rotation axis, the rotor configured to convey a flow of material from the charging opening to the emptying opening;
   a force measuring device connected to the housing, the force measuring device configured to detect an instantaneous load of the flow of material over the measuring section; and
   a vibrating funnel with a vibration generator disposed above the charging opening, the vibration generator being disposed in line with and vertically above the pivot axis of the housing.

2. The dosing device of claim 1, further comprising a compensator, wherein the vibrating funnel is suspended from a frame via the compensator so as to be capable of freely swinging in all directions in space.

3. The dosing device of claim 1, further comprising a compensator, wherein the vibrating funnel is connected to the housing via the compensator.

4. The dosing device of claim 1, wherein the vibration generator is configured to swing predominantly in a horizontal plane.

5. The dosing device of claim 1, wherein the vibration generator is configured to be continuously operated.

6. The dosing device of claim 1, wherein the rotor includes a peripheral ring having a slightly smaller diameter than a diameter of the housing so as to form a circumferential gap, the peripheral ring having an upper rim which extends in an outward direction to cover said circumferential gap.

7. The dosing device of claim 6, wherein assistant cams are provided in the circumferential gap, the emptying opening projecting beyond the peripheral gap in a radial direction and communicating with the circumferential gap.

8. The dosing device of claim 1, further comprising a blast nozzle arranged above the emptying opening, the blast nozzle being aligned downward, the blast nozzle configured to be operated with inert gas or hot-air.

9. The dosing device of claim 1, wherein the dosing device is supported on load cells with a framework so as to allow for check weighings.

10. The dosing device of claim 1, wherein the vibrating funnel can be activated in the case of varying instantaneous loads being too small or exceeding settable thresholds.

11. The dosing device of claim 1, wherein the pivot axis extends through the center of the charging opening and the bottom of the emptying opening.

* * * * *